United States Patent [19]
Lorber

[11] 3,805,872
[45] Apr. 23, 1974

[54] MAGNETICALLY ATTACHED COVER

[75] Inventor: Peter G. Lorber, Santa Barbara, Calif.

[73] Assignee: Lorber, Flinck Co., a partnership comprised of Peter G. Lorber and Allen E. Flinck, Santa Barbara, Calif.

[22] Filed: July 20, 1972

[21] Appl. No.: 273,395

[52] U.S. Cl........ 160/354, 160/DIG. 2, 160/DIG. 16
[51] Int. Cl............................................... A47h 3/00
[58] Field of Search........ 160/354, DIG. 2, DIG. 16, 160/368 S, 105, 368

[56] References Cited
UNITED STATES PATENTS

| | | | |
|---|---|---|---|
| 3,016,952 | 1/1962 | Shero | 160/354 |
| 3,679,505 | 7/1972 | Hinderaker et al. | 160/354 X |
| 1,744,177 | 1/1930 | Schuler | 160/354 |
| 2,619,168 | 11/1952 | Leverence | 160/354 |

Primary Examiner—W. C. Reynolds
Assistant Examiner—Philip C. Kannan
Attorney, Agent, or Firm—Fulwider Patton Rieber Lee & Utecht

[57] ABSTRACT

A vehicle having magnetically attached screens covering window openings, the screens having mounting and sealing borders thereon formed by flexible strips of magnet material attached to the screens to overlie metal portions of the vehicle body and conform to the contour thereof. Gaps are formed between the strips at the ends of pre-selected fold lines for the screens, and are filled with sponge material which permit the screens to be folded without excessive flexing of the magnet strips, and additional gaps are formed at the corners and filled with folded-over portions of a facing around the screen. A modification has an aperture in the screen for a projection such as a hinge bar extending through the window opening, a slit leading to the aperture, and a border of sealing material around the aperture and the slit.

8 Claims, 7 Drawing Figures

PATENTED APR 23 1974
3,805,872
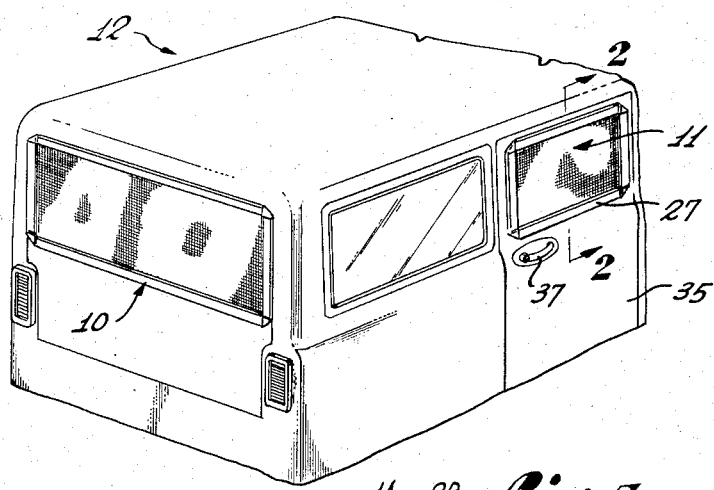
Fig. 1
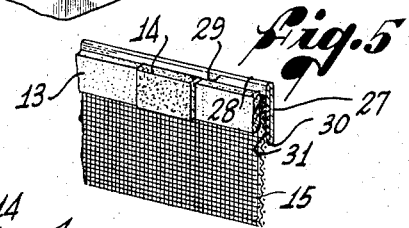
Fig. 2
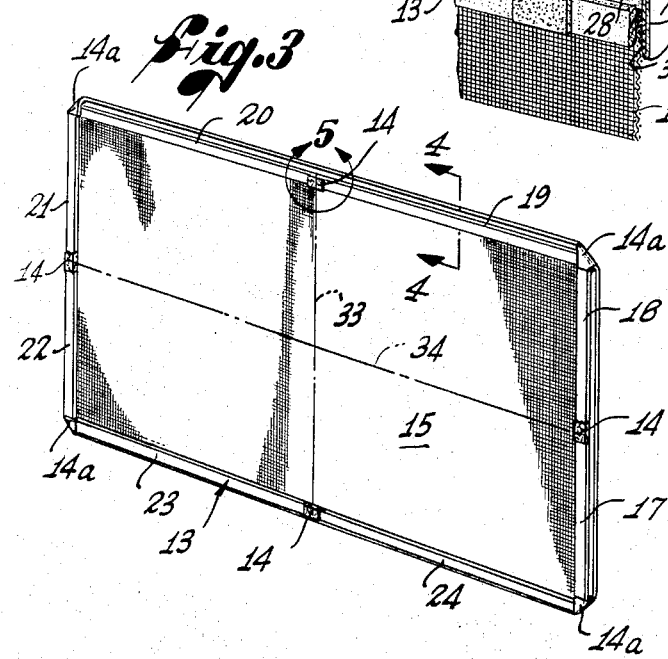
Fig. 3
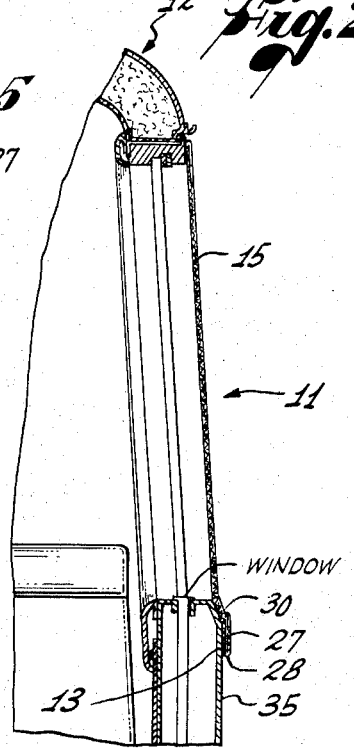
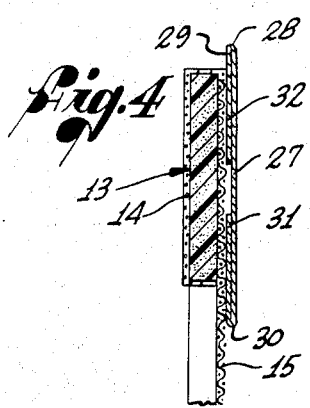
Fig. 4
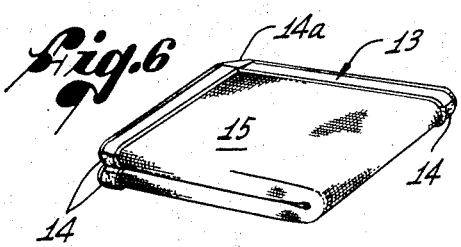
Fig. 6
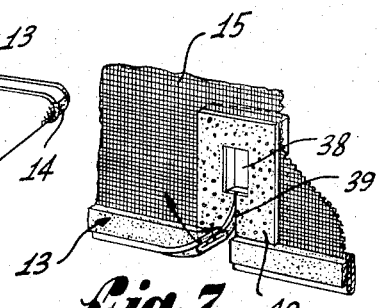
Fig. 7

MAGNETICALLY ATTACHED COVER

BACKGROUND OF THE INVENTION

This invention relates to a removable cover for an opening such as the window of an automobile or recreational vehicle, an opening into a cage or aquarium, and other openings of this general type, and has specific reference to a removable cover for an opening that is surrounded by magnetic metal, such as iron or steel, that often is non-planar or irregular in shape.

The invention is particularly well suited for use as a removable screen for windows of vehicles used for camping purposes, where it is desirable to be able to leave the windows open for the purpose of ventilation, while preventing entry by insects and the like. For these purposes, it is important that the screen be easily mountable over a window opening, regardless of the configuration of the frame defining the opening, easily removable after use, conveniently stored when not in use, and effective to seal entirely around the opening against the entry of insects.

The screens that have been available for the foregoing purposes have been deficient in one or more of the foregoing respects. For example, screens of the type shown in U.S. Pat. Nos. 1,465,821 and 2,098,174 require special shapes and semi-permanent mountings, and thus are relatively expensive, difficult to install and remove, and inconvenient to store. A screen of the type shown in U.S. Pat. No. 3,042,111, having bar magnets spaced along its border, is easy to install and remove, but does not, and was not intended to, seal the opening against the entry of insects.

SUMMARY OF THE INVENTION

The present invention resides in a removable cover comprising a panel of flexible cover material, such as a screen, that is sized and shaped to overlie the opening to be covered and to have a continuous marginal portion which overlies the surrounding metal around the opening, and a continuous mounting and sealing border on the marginal portion for magnetically engaging the surrounding metal and holding the cover securely but releasably thereon in effectively sealed relation. The border comprises an elongated and substantially continuous strip of flexible magnet material with all gaps of consequence in the magnet material filled by inserts of sealing material, preferably flexible and resiliently compressible, that are held against the metal by the attraction of the magnet material.

Another primary feature of the invention is the configuration of the mounting and sealing border which permits the cover to be folded readily into a compact storage condition without excessive flexing of the strips. For this purpose, gaps are formed in the strip of magnet material along preselected fold lines, and are filled with the flexible sealing material, which may be easily folded without danger of damage. The fold lines may be perpendicular axes of the cover, or in other preselected locations.

An optional feature is the provision of one or more apertures in the cover panel for admitting a projection through the panel in a predetermined position, with a secondary border around the aperture for maintaining the overall seal. For example, such an aperture may be provided for a hinge bar extending through the opening, with the secondary border extending from the main border, around the aperture, and back to the main border, thereby sealing the aperture around the projection. A slit extends from the edge of the cover into the aperture to facilitate positioning of the cover around the projection.

For a properly finished appearance, a facing of suitable sheet material should be applied to the edges of the screen to overlie the magnet material, which preferably is attached to the other side of the screen behind the facing. The border material may be attached in a variety of ways, including stitching, bonding with adhesive, and heat-sealing when heat-sealable materials are used, the use of hot-melt adhesive being preferred.

Other aspects and advantages of the invention will become apparent from the following detailed description, taken in conjunction with the accompanying drawings.

BRIEF DESCRIPTION OF THE DRAWINGS

FIG. 1 is a fragmentary perspective view of a vehicle having two window openings equipped with removable covers embodying the novel features of the present invention;

FIG. 2 is an enlarged fragmentary cross-sectional view taken along line 2—2 of FIG. 1;

FIG. 3 is a perspective view of one of the covers;

FIG. 4 is an enlarged fragmentary cross-section taken along line 4—4 of FIG. 3;

FIG. 5 is an enlarged fragmentary perspective view taken within the arc 5 of FIG. 3;

FIG. 6 is a perspective view showing the cover of FIG. 3 in a folded storage condition; and FIG. 7 is a fragmentary perspective view of an optional modification showing a clearance aperture in the cover panel and a secondary sealing border around this aperture.

DETAILED DESCRIPTION

As shown in the drawings for purposes of illustration, the invention is embodied in two removable screens 10 and 11 for covering two windows in a vehicle 12 of any conventional type, the shape shown herein being illustrative only. The screens are sized and shaped to cover the entire window opening, either on the inside or on the outside thereof, and to overlie the metallic portions of the vehicle surrounding the openings, completely around the latter.

In this instance, both the screens 10 and 11 and the associated openings are shown as generally rectangular in shape, and the screens are only slightly larger than the openings. As will become apparent, however, the screens need not be tailored to the specific size and shape so long as they fully cover the openings and overlie the metal surrounding the openings.

In accordance with the present invention, each screen 10, 11 is held removably in place on the vehicle in substantially insect-proof relation therewith by a magnetic mounting and sealing border, indicated generally by the number 13, secured to the portion of the screen for overlying the metal portion of the vehicle 12 surrounding the opening, the border comprising an elongated and substantially continuous band of flexible magnet material for holding the screen tightly against the vehicle around the opening. All gaps of any consequence that are present in the border are filled with inserts 14 of resiliently compressible sealing material that fill the gaps and cooperate with the magnet material is maintaining the seal.

With the border formed by flexible material, the screen 10, 11 is able to flex and conform to the contour of the vehicle 12, around the windows, which typically are surrounded by non-planar metallic parts. Tight surface-to-surface contact between the magnet band and the metal body of the vehicle provides an effective seal along the full length of the strip, and the sealing inserts 14 in the gaps complete a full peripheral seal.

While the screens 10, 11 may be made with virtually continuous, gap-free borders of magnet material, in the preferred mode of the invention, a plurality of gaps are provided in the magnet material at the opposite ends of one or more preselected fold lines across the material, permitting folding of the screen to a compact storage condition. Inserts 14 of the sealing material fill these gaps.

More specifically, with reference to FIGS. 3-5, the illustrative screen 11 comprises a rectangular panel 15 of screen material such as fiber glass screening, with eight elongated strips 17 through 24 of magnet material arranged around the edges of the panel, on one side thereof. Suitable flexible strip magnet materials are sold by General Tire and Rubber Company and Minnesota Mining and Manufacturing Company, among others.

At the four corners of the panel 15, the strips may be disposed in end-to-end abutting relation, or may be slightly spaced apart, as shown in FIG. 3, in which case the resulting corner gaps would be filled with triangular sealing inserts 14a. About midway along each edge of the panel, the ends of the two strips extending along the edge are spaced apart to leave an intentional gap of selected width, for example, of one-half inch to one inch in width. Interposed in these gaps are the sealing inserts 14 in the form of small, preferably rectangular strips of suitable material such as sponge rubber or foam plastic. For a good seal, these inserts are slightly thicker than the magnet strips, but are of approximately the same width as the magnet strips.

In addition, the edges of the panel 15 preferably are masked with a front facing 27 of flexible sheet material, such as sheet vinyl, which overlies the front of the panel, that is, the side opposite the magnet strips, and the latter are concealed behind the facing, as shown in FIG. 4. To provide smooth edges on the sceen, the facing has a fold at 28 which forms the outer edge of the panel, an outer flap 29 extending from the fold 28 inwardly in front of the magnet material, and a second fold 30 along the inner edge of the facing joining the latter to a third flap 31 sandwiched between the front flap and the panel.

An attractively finished appearance may be achieved at the corners of the panel 15 by forming angular corners on the facing and then bending the facing into the gaps left at the corners, as shown in FIG. 3. When the corner gaps are properly sized, the fold-over corners of the facing will fit closely in the gaps and lie substantially flush with the magnet strips to form the sealing inserts 14a, the facing having about the same thickness as the magnet strips.

A variety of means may be used to attach the facing 27 and the border 13 to the panel 15. Herein, layers 32 of the hot-melt adhesive are applied between the magnet strips, the panel 15 and the facing 27 to secure them together. This adhesive also holds the inserts 14 and 14a in place in the gaps, and may be applied as a single bead and pressed through the screen into bonding engagement with both the facing and the magnet strips.

As shown in FIG. 3, the fold lines for the screen 11 may be perpendicular axes 33 and 34 of the screen, with each folding gap about midway between the two adjacent corners. With this arrangement, one longitudinal fold and one transverse fold will place the screen in the condition shown in FIG. 6. Of course, the outside shape of the screen and the desired shape when folded will determine the positions of the gaps.

Shown in FIG. 7 is a modification of the screen 11 which may be used when the screen is to be applied over an area that has a projection, such as a hinge, extending through the opening to be covered. For example, the windows of some vehicles have arcuate bars that are connected to the window to support it for swinging between open and closed positions and the bars extend through the window opening when the window is in the open position.

To accommodate such a projection, the form shown in FIG. 7 (in which the numbers used in FIGS. 1-6 are applied to corresponding parts) has an aperture 38 shaped to fit around the projection, a slit 39 leading from the adjacent edge of the panel 15, through the border 13 of magnet material and into the aperture, to facilitate fitting of the screen around the projection, and a secondary border 40 of the resiliently compressible sealing material secured to the screen around the aperture. This secondary border either extends completely around the aperture, or extends from the magnet material around the aperture and back to the magnet material, to seal around the projection when the screen is in place. It is to be understood that the aperture and the secondary sealing border with be used only for special circumstances in which there is a projection in a known, interfering position, and may be specially shaped to fit around the projection.

From the foregoing, it will be evident that the present invention provides a removable cover or screen of relatively simple and inexpensive construction which may be readily applied to any opening smaller than the cover and having surrounding metal for engagement with the mounting and sealing border. The entire cover flexes readily to conform to non-planar contours of vehicles and the like, provides a full, peripheral, insect-proof seal around the opening, and may be rolled, or preferably folded, into compact form for convenient storage.

It also will be apparent that, while specific embodiments have been illustrated and described, various modifications and changes may be made without departing from the spirit and scope of the invention.

I claim:

1. A removable screen for an opening of preselected size and shape surrounded by magnetic material, comprising:
   a panel of flexible screening material sized and shaped to cover said opening and to overlie said magnetic material on all sides of said opening;
   a facing of flexible material covering the edge portions of said panel on one side thereof;
   a plurality of elongated strips of magnet material arranged around said panel on the other side thereof and behind said facing to form a substantially continuous border for overlying said magnetic material around said opening, some of said strips having spaced ends defining folding gaps in said border at the opposite ends of at least one preselected fold line for said panel, and additional gaps at the corners thereof;

first sealing inserts in said folding gaps composed of flexible and resiliently compressible sealing material and filling the folding gaps so as to cooperate with said strips in sealing the opening against entry of insects while permitting the cover to be folded for storage without excessive flexing of said strips;

and second sealing inserts in said additional gaps at the corners of said screen, said second inserts comprising corner portions of said facing folded over and into said additional gaps and lying substantially flush with the magnet strips.

2. A removable screen as defined in claim 1 further including an aperture in a preselected position in said panel for admitting a projection through the latter when the cover is in place, and means around said aperture for sealing around the latter when the cover is in place.

3. A removable screen as defined in claim 2 in which said means comprise a border of resiliently compressible sealing material.

4. A removable screen as defined in claim 3 in which said panel has a slit extending into said aperture from the edge of the panel adjacent the aperture and through said border of magnet material, said border of sealing material extending from the border of magnet material around said aperture and back to said magnet material.

5. A removable cover for an opening of preselected size and shape surrounded by magnetic material, comprising:

a panel of flexible cover material sufficiently larger than said preselected size and shape to cover the entire opening and leave a continuous marginal portion of said panel overlying the surrounding magnetic material;

and a mounting and sealing border extending around and secured to said continuous marginal portion of said panel to overlie the surrounding magnetic material, said mounting and sealing border comprising a plurality of elongated strips of magnet material secured to one side of said panel along said marginal portion, some of said strips having ends spaced from the adjacent ends of adjacent strips to leave short gaps in said border, and sealing inserts of flexible resiliently compressible material secured to said one side of said panel within said gaps, and filling the latter so as to be pressed into sealing engagement with said magnetic material when said magnet material is in engagement with said magnetic material, said gaps being arranged along preselected fold lines extending across said panel to permit folding of the panel without excessive flexing of said magnet material.

6. A removable cover as defined in claim 5 in which said fold lines extend along perpendicular axes of said cover and said gaps are at opposite ends of said axes.

7. A removable cover as defined in claim 5 in which said panel has an aperture therein in a preselected position in said marginal portion for admitting a projection through said panel, and further including a secondary border of resiliently compressible sealing material extending around said aperture to seal around the latter when said cover is in place over the opening with the projection extending through said aperture.

8. A removable cover as defined in claim 5 in which said magnet material comprises a plurality of elongated strips of magnet material secured to one side of said panel along said marginal portion, and having ends spaced apart at corners of said panels, and further including a facing overlying said magnet material on the other side of said panel, said facing having corners folded into and filling the gaps between said strips at said corners.

* * * * *